Nov. 23, 1926.
O. L. BARNEBEY
MEANS FOR TRANSPORTING AND STORING GASES
Filed August 2, 1920
1,608,155
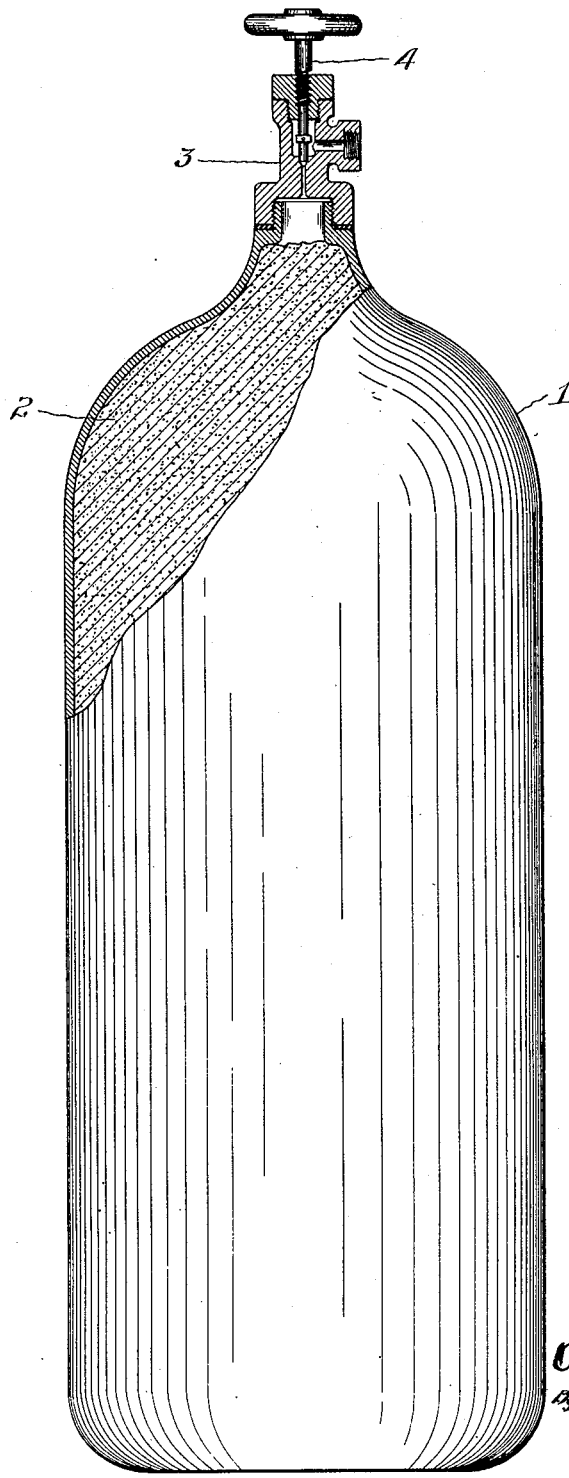

Patented Nov. 23, 1926.

1,608,155

UNITED STATES PATENT OFFICE.

OSCAR L. BARNEBEY, OF CLEVELAND, OHIO, ASSIGNOR TO AMERICAN SOLVENT RECOVERY CORPORATION, A CORPORATION OF OHIO.

MEANS FOR TRANSPORTING AND STORING GASES.

Application filed August 2, 1920. Serial No. 400,673.

The invention relates both to the method of handling gases and to the apparatus employed. Heretofore the transportation, storage and use of many gases, especially those of low boiling points and high vapor tension, have been subject to inconvenience and difficulties due to the fact that they had to be highly compressed and transported and used while under high pressure. The old procedure required special high pressure pumps and compression systems, extraordinarily heavy cylinders to withstand the high pressures involved, special valve and reducing valve connections for maintaining the pressure without leakage and for regulating the exit flow from the cylinders. This heavy construction of container has been very costly so much so in fact that the container has usually been much more expensive than its contents.

The main object of the present invention is to obviate the inconvenience, danger and heavy expense incident to this high pressure system of handling gases, and I have discovered that this can be accomplished by the use of highly adsorptive materials as vehicles for the gas in transporting, storage and handling the same. Adsorptive materials are such as have the capacity or power of condensing gas in large amounts on their exterior surfaces, or on the surfaces within their pores, interstices, or cracks or otherwise within the particles of the material, in such a manner as to concentrate large quantities of gas within a small space. Adsorptive materials are now available which contain enormous pore or interstitial surfaces or crack areas. Gases condensed on these surfaces or areas may be assumed to be chemically or physically combined, as in the highly compressed or liquefied state. The force of adsorption with certain materials is very great and is manifested in many cases by the evolution of large amounts of heat which shows the vigor of the adsorptive effect. The highly adsorptive materials adsorb gases in large quantities and after adsorption the gases are held firmly within or on the surface of the particles of the adsorbing medium and in this condition the force of adsorption prevents the gas from exerting the original gaseous pressure caused by the original vapor pressure of the gas. At the same time by subjecting the adsorbent to the action of heat or vacuum or both the gas may be evolved from the adsorbent for use as desired.

Adsorptive materials found applicable to this invention comprise the following. Carbon or carbon-containing material when subjected to heat treatment in the presence of steam at temperatures varying from 700° C. to 1100° C. becomes highly adsorptive. The resulting material is called "activated carbon," is an excellent adsorber and is a very good medium for transporting gases. For example, ordinary charcoal will not absorb any material amount of carbon tetrachloride, but if such ordinary charcoal is subjected to the above described steam and heat treatment it acquires the capacity of adsorbing relatively large amounts of carbon tetrachloride and will separate carbon tetrachloride from a mixture thereof with air when the mixture is passed through it. And similarly the activating treatment renders charcoal more or less highly adsorptive of various other gases.

Other available materials are hydrated alumina, silica, titania or rare earth oxides precipitated from solution, thoroughly washed and carefully dried. Of these materials alumina and rare earth oxides are typical of metallic oxides, and silica and titania are typical of non-metallic oxides. This procedure makes very porous adsorbing materials, and they are good adsorbers for adsorbing gases for shipment.

Orthoclase or other natural silicates can be fused with sodium carbonate, the sodium aluminate and silicate dissolved in water, after which the hydrated silica and alumnia are precipitated by neutralization with acid and after filtration the gelatinous mass is carefully dried. The resultant solid material is in part a compound, namely hydrated aluminum silicate, and in part a mixture of said silicate, hydrated alumina and hydrated silica, in proportions varying with the nature of the original materials and with the details of the process. This resultant material is highly adsorptive and is applicable to this invention.

In carrying out my invention I place the selected adsorptive material in a suitable gas tight container fitted with the usual control valve, and in order that the invention may be understood as clearly as possible reference is had to the accompanying drawing which shows a gas holder, partly in side elevation and partly in section, in accordance with my invention.

In the drawing, 1 is a gas tight metal container and 2 is a suitable adsorptive material, preferably highly activated carbon, which fills the container. The mouth of the container is fitted with a gas connection 3 which carries the usual needle valve 4 to control the passage of gas. The adsorbent is preferably of granular consistency permitting it to be charged into the container through the mouth thereof before the connection 3 is attached.

To prepare the holder for use the container is exhausted by connecting a vacuum pump to the connection 3 and withdrawing the air from the adsorbent 2. After the air has been removed the connection 3 may be connected to the source of gas to be charged into the container and, the valve 4 having been opened, the gas is allowed to enter until the adsorbent is saturated. At the beginning of the adsorption a partial vacuum is usually produced inasmuch as the gas is rapidly taken up. As more and more gas enters, the adsorbent becomes more and more saturated and the degree of vacuum diminishes until the pressure becomes atmospheric. Should it be desired, more gas can then be added by increasing the pressure. The pressure used is determined by the strength of the containing vessel, account being taken of the heat to which the container may be subjected in shipping and handling and to the character of the gas. The application of heat increases the pressure, and the pressure is different for different gases. Owing to the evolution of heat by the adsorbing action, it is frequently necessary or desirable to cool the container during adsorption in order to charge the maximum amount of gas into the adsorbing medium.

When it is desired to remove the gas adsorbed, all that is necessary is to heat the vessel. As the vessel warms up the gas is evolved from the adsorbing material. When a gentle evolution of gas is wanted the heat is applied slowly. When a rapid evolution is desired the heat is applied rapidly. The heat may be applied by immersing in warm or hot water, brine or other medium, by using a steam coil, by direct heating with a burner or blast or any other convenient method. When heat is undesirable the gas is removed by subjecting the interior of the container to the action of a vacuum or a combination of heat and vacuum can be used to remove the gas from the container.

The following examples will further explain the practice of this invention:

*Example 1.*—A gallon container is made of sheet iron, and, after being welded in the conventional manner and valve properly seated in the container, filled with activated charcoal. Chlorine is then allowed to enter until four pounds of chlorine have been adsorbed after which the valve is closed and the chlorine is ready for shipment. When the shipment has been received at its destination and is needed for use the container is warmed slightly, valve opened and chlorine is discharged for use. When the chlorine is used up the cylinder is returned for refilling or is discarded.

*Example 2.*—It is desired to transport 50 pounds of ethyl chloride. A container is made of sheet metal, approximately 20 gauge, containing 4 cu. ft. and filled with highly activated coconut charcoal and the 50 lbs. of ethyl chloride added. The valve is closed and capped after which it is ready to be transported to destination and used as above indicated.

*Example 3.*—100 lbs. of alumina-gel is enclosed in a sheet metal container, the air is exhausted and sulphur dioxide is passed into the container and adsorbed by the gel. The valve is closed and the sulphur dioxide is then ready to be transported, and used as above described.

*Example 4.*—Methyl ether is adsorbed in activated charcoal and filled into sheet iron cans. The covers are fitted snugly and soldered after which the ether is ready for transportation and use.

As the above examples indicate, the gas can be adsorbed before the adsorbent is charged into the storing or shipping container, though in most cases I prefer to adsorb the gas in said container, after first exhausting the air therefrom.

This invention allows the transportation of gases in concentrated form at pressures below those necessary to liquefy or solidify the gases or without transporting them as highly compressed gases. This method is also much safer. When liquefied, solidified or highly compressed gases are in the course of travel and become accidentally or naturally heated rather highly the expanding force becomes enormous. However, an adsorbing medium of the nature described in this invention does not allow such high pressures to develop on account of the fact that as the pressure increases likewise the adsorption effect increases, which serves as a check on the expanding or evolving gas effect caused by increasing temperatures. In other words, the adsorbent acts as a stabilizer as well as a material for holding the gas.

By using materials possessing high adsorbing capacities the amount of gases transported in this manner is large. The containing vessels are relatively inexpensive as compared to those required for highly compressed gases, since this invention greatly diminishes the vapor pressure of the gases. This cheaper construction of vessels is of great economic value in transporting many gases. Due to the simplicity of construction the containers can be more readily obtained when there is a shortage of containers.

It is to be understood that the term "gas" is used herein in a broad sense and is intended to include vapors, as well as gases that are fixed at ordinary temperatures.

It also will be understood that the particular adsorbent materials and the particular applications of my invention which I have referred to in the foregoing description are mentioned only for purposes of illustration and explanation, the scope of the invention being indicated by the appended claims.

What I claim is:

1. Means for storing and transporting gases comprising a gas tight container and a gas-adsorbing material therein which has an adsorptive capacity of the order of that of activated carbon and is adapted to adsorb great amounts of the gas at atmospheric pressure, to hold said gas at all atmospheric temperatures and to give off said gas when heated to temperatures ranging substantially above the range of atmospheric temperatures.

2. Means for storing and transporting gases comprising a gas tight container and activated carbonaceous material therein adapted to adsorb great amounts of the gas to be stored or transported.

3. A gas package comprising a gas tight container, activated charcoal therein and gas adsorbed in said charcoal.

4. Means for storing and transporting gases comprising a gas tight container having a valve-controlled opening and a gas-adsorbing material therein which has an adsorptive capacity of the order of that of activated carbon and is adapted to adsorb great amounts of the gas at atmospheric pressure to hold said gas at all atmospheric temperatures and to give off said gas when heated to temperatures ranging substantially above the range of atmospheric temperatures.

In testimony whereof, I hereunto affix my signature.

OSCAR L. BARNEBEY.